United States Patent
Moulsley et al.

(10) Patent No.: US 9,178,577 B2
(45) Date of Patent: Nov. 3, 2015

(54) RADIO COMMUNICATION SYSTEM WITH PLURAL PATHS FROM A PRIMARY STATION WITH PLURAL ANTENNAS TO A SECONDARY STATION

(75) Inventors: Timothy J. Moulsley, Caterham (GB); Matthew P. J. Baker, Canterbury (GB); Bernard Hunt, Redhill (GB)

(73) Assignees: Koninklijke Philips N.V., Einhoven (NL); Sharp Corporation, Osaka (JP)

(*) Notice: Subject to any disclaimer, the term of this patent is extended or adjusted under 35 U.S.C. 154(b) by 1981 days.

(21) Appl. No.: 10/128,636

(22) Filed: Apr. 23, 2002

(65) Prior Publication Data

US 2002/0159431 A1  Oct. 31, 2002

(30) Foreign Application Priority Data

Apr. 25, 2001  (GB) .................................. 0110125.2

(51) Int. Cl.
*H04B 7/04*  (2006.01)
(52) U.S. Cl.
CPC ........................................ *H04B 7/04* (2013.01)
(58) Field of Classification Search
CPC ................................................. H04W 40/125
USPC ......... 370/349, 389, 329, 338, 341, 470, 330, 370/337, 332, 321, 333, 336, 347, 311, 331, 370/335, 339, 340, 342, 345, 441, 442, 318, 370/310, 320, 204, 209, 210, 328, 431, 370/479; 375/267, 148, 262, 341, 346, 144, 375/348, 349; 343/853; 455/101, 103, 561, 455/19, 562.1, 132, 562, 277.1, 272, 273, 455/277.2, 522, 82, 121, 279.1, 129, 422, 455/424, 509, 450–453, 455
See application file for complete search history.

(56) References Cited

U.S. PATENT DOCUMENTS 4,506,385 A * 3/1985 Fedde et al. ................ 455/226.1
4,675,863 A * 6/1987 Paneth et al. ................. 370/334
(Continued)

FOREIGN PATENT DOCUMENTS

EP  0735701 A2  10/1996
EP  0736979 A2  10/1996
(Continued)

OTHER PUBLICATIONS

"V-Blast: An architecture for realizing very high data rates over the rich-scattering wireless channel", P W Wolniansky et al. 1998 URSI International Symposium on Signals, Systems and Electronics, Pisa, Italy, Sep. 29-Oct. 2, 1998.
(Continued)

*Primary Examiner* — Gregory Sefcheck

(57) ABSTRACT

A radio communication system comprises a communication channel for the transmission of data packets (302) from a primary station having a plurality of antennas to a secondary station having at least one antenna. The channel comprises a plurality of paths, and the primary station transmits a plurality of packets substantially simultaneously. Each of the plurality of packets is transmitted via a different subset of the plurality of paths, for example by arranging for each packet to be transmitted via a different antenna or antenna beam. The secondary station receives the plurality of data packets, determines whether each packet is received correctly and signals this determination (typically as an acknowledgement (304) or a negative acknowledgement (306)) to the primary station for each of the plurality of packets. The signaling may be by any convenient means, for example transmitting each acknowledgement or negative acknowledgement via a different subset of available uplink paths.

20 Claims, 3 Drawing Sheets

(56) References Cited

U.S. PATENT DOCUMENTS

| | | | |
|---|---|---|---|
| 4,817,089 A * | 3/1989 | Paneth et al. | 370/280 |
| 4,912,705 A * | 3/1990 | Paneth et al. | 370/334 |
| 5,022,024 A * | 6/1991 | Paneth et al. | 370/334 |
| 5,119,375 A * | 6/1992 | Paneth et al. | 370/345 |
| 5,121,391 A * | 6/1992 | Paneth et al. | 370/341 |
| 5,371,734 A * | 12/1994 | Fischer | 370/311 |
| 5,657,358 A * | 8/1997 | Panech et al. | 375/356 |
| 5,687,194 A * | 11/1997 | Paneth et al. | 375/283 |
| 5,699,369 A | 12/1997 | Guha | 714/774 |
| 5,734,678 A * | 3/1998 | Paneth et al. | 375/240 |
| 6,014,374 A * | 1/2000 | Paneth et al. | 370/345 |
| 6,067,290 A | 5/2000 | Paulraj et al. | 370/329 |
| 6,088,337 A | 7/2000 | Eastmond et al. | |
| 6,151,310 A * | 11/2000 | Dent | 370/330 |
| 6,192,256 B1 | 2/2001 | Whinnett | |
| 6,208,663 B1 * | 3/2001 | Schramm et al. | 370/465 |
| 6,282,180 B1 * | 8/2001 | Paneth et al. | 370/330 |
| 6,289,054 B1 * | 9/2001 | Rhee | 375/240.27 |
| 6,308,294 B1 * | 10/2001 | Ghosh et al. | 714/751 |
| 6,327,310 B1 * | 12/2001 | Hochwald et al. | 375/259 |
| 6,334,059 B1 * | 12/2001 | Stilp et al. | 455/404.2 |
| 6,366,570 B1 * | 4/2002 | Bhagalia | 370/342 |
| 6,414,945 B1 * | 7/2002 | Chennakeshu et al. | 370/317 |
| 6,438,389 B1 * | 8/2002 | Sandhu et al. | 455/562.1 |
| 6,473,467 B1 * | 10/2002 | Wallace et al. | 375/267 |
| 6,502,063 B1 * | 12/2002 | Eriksson et al. | 702/190 |
| 6,535,721 B1 * | 3/2003 | Burke et al. | 455/137 |
| 6,549,585 B2 * | 4/2003 | Naguib et al. | 375/267 |
| 6,615,382 B1 * | 9/2003 | Kang et al. | 714/748 |
| 6,678,523 B1 * | 1/2004 | Ghosh et al. | 455/442 |
| 6,728,233 B1 * | 4/2004 | Park et al. | 370/342 |
| 6,751,480 B2 * | 6/2004 | Kogiantis et al. | 455/562.1 |
| 6,771,706 B2 * | 8/2004 | Ling et al. | 375/267 |
| 6,771,905 B1 | 8/2004 | Bortz | 398/45 |
| 6,795,407 B2 * | 9/2004 | Chesson | 370/311 |
| 6,801,790 B2 * | 10/2004 | Rudrapatna | 455/562.1 |
| 6,823,005 B1 * | 11/2004 | Chuang et al. | 375/227 |
| 6,937,592 B1 * | 8/2005 | Heath et al. | 370/342 |
| 6,970,434 B1 * | 11/2005 | Mahany et al. | 370/256 |
| 6,999,432 B2 * | 2/2006 | Zhang et al. | 370/328 |
| 6,999,497 B2 * | 2/2006 | Uesugi | 375/130 |
| 7,002,923 B2 * | 2/2006 | Golitschek et al. | 370/253 |
| 7,006,464 B1 * | 2/2006 | Gopalakrishnan et al. | 370/328 |
| 7,027,418 B2 * | 4/2006 | Gan et al. | 370/329 |
| 7,042,956 B2 * | 5/2006 | El-Gamal et al. | 375/267 |
| 7,062,295 B2 * | 6/2006 | Yoshii et al. | 455/562.1 |
| 7,068,619 B2 * | 6/2006 | Balachandran et al. | 370/328 |
| 7,110,464 B2 * | 9/2006 | El-Gamal et al. | 375/267 |
| 7,113,521 B2 * | 9/2006 | Miller et al. | 370/474 |
| 7,133,455 B2 * | 11/2006 | Henning | 375/240.27 |
| 7,415,076 B2 * | 8/2008 | El-Gamal et al. | 375/267 |
| 7,583,614 B2 * | 9/2009 | Golitschek et al. | 370/253 |
| 7,715,469 B2 * | 5/2010 | Chuang et al. | 375/227 |
| 2001/0008542 A1 * | 7/2001 | Wiebke et al. | 375/141 |
| 2001/0033622 A1 * | 10/2001 | Jongren et al. | 375/267 |
| 2001/0050964 A1 | 12/2001 | Foschini et al. | |
| 2002/0054578 A1 * | 5/2002 | Zhang et al. | 370/328 |
| 2002/0080802 A1 * | 6/2002 | Sachs et al. | 370/401 |
| 2002/0119778 A1 | 8/2002 | Baker et al. | |
| 2002/0127978 A1 | 9/2002 | Khatri | |
| 2002/0141436 A1 * | 10/2002 | Toskala | 370/442 |
| 2002/0154610 A1 * | 10/2002 | Tiedemann et al. | 370/329 |
| 2002/0193146 A1 * | 12/2002 | Wallace et al. | 455/562 |

FOREIGN PATENT DOCUMENTS

| | | |
|---|---|---|
| JP | H04207421 A | 7/1992 |
| JP | 1155206 A | 2/1999 |
| JP | 2000101667 A | 4/2000 |
| JP | 2000513918 A | 10/2000 |
| KR | 19990086133 A | 12/1999 |
| WO | 9900914 A1 | 1/1999 |
| WO | WO0171843 | 9/2001 |
| WO | 0245293 A3 | 6/2002 |
| WO | 02056499 A1 | 7/2002 |
| WO | 02061969 A1 | 8/2002 |
| WO | 02069664 A1 | 9/2002 |

OTHER PUBLICATIONS

"Effects of Iterative Detection and Decoding on the Performance of BLAST", IEEE Globecom 2000 Conference, San Francisco, Nov. 27-Dec. 1, 2000.

"Radio Communication System" U.S. Appl. No. 10/084,735, filed Feb. 2, 2002.

"Radio Communication System", U.S. Appl. No. 10/043,532, filed Jan. 11, 2002.

"Radio Communication System", U.S. Appl. No. 10/055,370, filed Jan. 23, 2002.

"Radio Communication System", U.S. Appl. No. 09/995,467, filed Nov. 28, 2001.

Nokia, "Double Data Rate for FDD Downlink Through Channel Code Puncturing in MIMO Channels", 3GPP TSG RAN WG1, TSGR1#19 R1-01-0258, 2001, p. 1-4.

* cited by examiner

RADIO COMMUNICATION SYSTEM WITH PLURAL PATHS FROM A PRIMARY STATION WITH PLURAL ANTENNAS TO A SECONDARY STATION

The present invention relates to a radio communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other mobile radio systems.

In a radio communication system, radio signals typically travel from a transmitter to a receiver via a plurality of paths, each involving reflections from one or more scatterers. Received signals from the paths may interfere constructively or destructively at the receiver (resulting in position-dependent fading). Further, differing lengths of the paths, and hence the time taken for a signal to travel from the transmitter to the receiver, may cause inter-symbol interference.

It is well known that the above problems caused by multipath propagation can be mitigated by the use of multiple antennas at the receiver (receive diversity), which enables some or all of the multiple paths to be resolved. For effective diversity it is necessary that signals received by individual antennas have a low cross-correlation. Typically this is ensured by separating the antennas by a substantial fraction of a wavelength, although closely-spaced antennas may also be employed by using techniques disclosed in our International patent application WO01/71843 (applicant's reference PHGB000033). By ensuring use of substantially uncorrelated signals, the probability that destructive interference will occur at more than one of the antennas at any given time is minimised.

Similar improvements may also be achieved by the use of multiple antennas at the transmitter (transmit diversity). Diversity techniques may be generalised to the use of multiple antennas at both transmitter and receiver, known as a Multi-Input Multi-Output (MIMO) system, which can further increase system gain over a one-sided diversity arrangement. As a further development, the presence of multiple antennas enables spatial multiplexing, whereby a data stream for transmission is split into a plurality of sub-streams, each of which is sent via many different paths. One example of such a system is described in U.S. Pat. No. 6,067,290, another example, known as the BLAST system, is described in the paper "V-BLAST: an architecture for realising very high data rates over the rich-scattering wireless channel" by P W Wolniansky et al in the published papers of the 1998 URSI International Symposium on Signals, Systems and Electronics, Pisa, Italy, 29 Sep. to 2, Oct. 1998.

The performance gains which may be achieved from a MIMO system may be used to increase the total data rate at a given error rate, or to reduce the error rate for a given data rate, or some combination of the two. A MIMO system can also be controlled to reduce the total transmitted energy or power for a given data rate and error rate.

One area in which MIMO techniques may be applied is a High-Speed Downlink Packet Access (HSDPA) scheme, which is currently being developed for UMTS and which may facilitate transfer of packet data to a mobile station at up to 4 Mbps. In one proposed embodiment of HSDPA separate data streams are sent from respective antennas at a Base Station (BS), which data streams can in principle be received and decoded by a Mobile Station (MS) having at least as many antennas as there are data streams. An ARQ (Automatic Repeat reQuest) scheme is needed to ensure correct delivery of each data packet, since accurate data transmission is viewed as more important than the reduced system throughput under poor channel conditions (due to multiple re-transmissions).

A problem with the use of a MIMO system for packet data transmission is the impact of differing radio link qualities on the communication system. For example, some of the data streams may have very poor quality radio links, and if all the data is combined this will degrade the performance of the other links.

An object of the present invention is to provide a MIMO system having improved performance.

According to a first aspect of the present invention there is provided a radio communication system having a communication channel comprising a plurality of paths between a primary station having a plurality of antennas and a secondary station having at least one antenna, wherein the primary station has means for transmitting substantially simultaneously a plurality of data packets to the secondary station, each packet being transmitted via a different subset of the plurality of paths, and the secondary station has means for receiving the plurality of data packets, for determining whether each packet is received correctly and for signalling this determination to the primary station for each of the plurality of packets.

By transmitting a plurality of packets in parallel, each via a subset of the available paths in the communication channel, improved performance is enabled compared with known systems in which each packet is transmitted via the same set of paths. This is because the effect of one of the paths providing a poor quality radio link is restricted to a subset of the transmitted packets.

According to a second aspect of the present invention there is provided a primary station having a plurality of antennas for use in a radio communication system having a communication channel comprising a plurality of paths between the primary station and a secondary station having at least one antenna, wherein means are provided for transmitting substantially simultaneously a plurality of data packets to the secondary station, each packet being transmitted via a different subset of the plurality of paths, and for receiving from the secondary station a determination of whether each packet is received correctly.

In one embodiment of the present invention each data packet is restricted to a subset of the available paths by mapping it to one of the primary station's antennas. In another embodiment, beamforming techniques are used to transmit each data packet in a particular direction. Data packets transmitted via one subset of paths may have different transmission parameters, for example modulation and/or coding schemes and power levels. Closed loop power control may be applied independently to each subset of paths.

According to a third aspect of the present invention there is provided a secondary station having at least one antenna for use in a radio communication system having a communication channel comprising a plurality of paths between a primary station having a plurality of antennas and the secondary station, wherein means are provided for receiving a plurality of data packets transmitted substantially simultaneously by the primary station, each packet being transmitted via a different subset of the plurality of paths, for determining whether each packet is received correctly and for signalling this determination to the primary station for each of the plurality of packets.

The secondary station may signal its determination of whether each packet is received correctly via a subset of the available uplink paths to the primary station, or in any other suitable manner.

According to a fourth aspect of the present invention there is provided a method of operating a radio communication system having a communication channel comprising a plurality of paths between a primary station having a plurality of antennas and a secondary station having at least one antenna, wherein the primary station transmits substantially simultaneously a plurality of data packets to the secondary station, each packet being transmitted via a different subset of the plurality of paths, and the secondary station receives the plurality of data packets, determines whether each packet is received correctly and signals this determination to the primary station for each of the plurality of packets.

The present invention is based upon the recognition, not present in the prior art, that improved performance in a MIMO system used for packet data transfer can be obtained by transmitting data packets in parallel by different subsets of the available paths.

Embodiments of the present invention will now be described, by way of example, with reference to the accompanying drawings, wherein.

In the drawings the same reference numerals have been used to indicate corresponding features.

Figure 1:
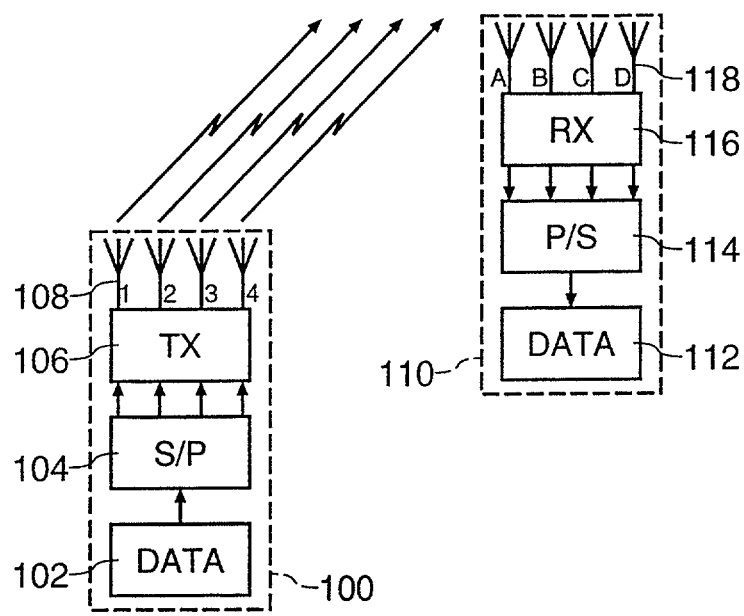
FIG. 1 is a block schematic diagram of an embodiment of a MIMO radio system.

FIG. 1 shows an example of a MIMO system for the transmission of downlink packet data from a primary station 100 to a secondary station 110. The primary station 100 comprises a data source 102 which provides a data stream for transmission to the secondary station 110. This stream is divided by a serial to parallel converter (S/P) 104 to generate a plurality of data sub-streams which are provided to a transmitter (TX) 106. The transmitter 106 arranges for the data sub-streams to be sent to multiple antennas 108 (labelled 1, 2, 3 and 4 in FIG. 1) for transmission from the Base Station (BS) 100 to a Mobile Station (MS) 110. The antennas 108 are assumed to be substantially omni-directional (or designed to give coverage over a sectored cell).

Suitable coding, typically including Forward Error Correction (FEC), may be applied by the BS 100 before multiplexing. This is known as vertical coding, and has the advantage that coding is applied across all sub-streams. However, problems may arise in extracting the sub-streams since joint decoding is needed and it is difficult to extract each sub-stream individually. As an alternative each sub-stream may be coded separately, a technique known as horizontal coding which may simplify receiver operation. These techniques are discussed for example in the paper "Effects of Iterative Detection and Decoding on the Performance of BLAST" by X Li et al in the Proceedings of the IEEE Globecom 2000 Conference, San Francisco, Nov. 27 to Dec. 1, 2000.

If vertical coding is used the FEC which is applied must have sufficient error-correcting ability to cope with the entire MIMO channel, which comprises a plurality of paths. It will be appreciated that the set of paths between BS 100 and MS 110 will typically include direct paths and indirect paths, the latter being where signals are reflected by one or more scatterers.

The MS 110 comprises a plurality of antennas 118 (labelled A, B, C and D in FIG. 1). Signals received by the antennas 118 are provided to a receiver (RX) 116, which extracts the plurality of transmitted data sub-streams from the received signals. The data sub-streams are then recombined by a parallel to serial converter (P/S) 114 and provided to a data output block 112. Although both the BS 100 and MS 110 are shown as having the same number of antennas, this is not necessary in practice and the numbers of antennas can be optimised depending on space and capacity constraints.

Figure 2:
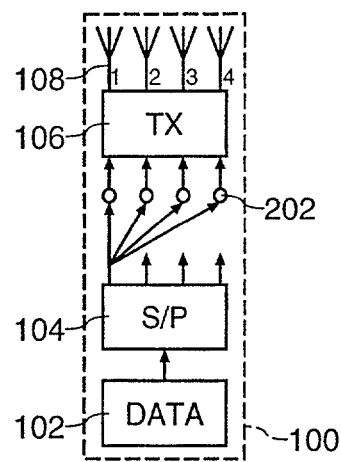
FIG. 2 is a block schematic diagram of an embodiment of a base station for a MIMO radio system which weights substream signals before transmission.

In the simplest implementation of a BS 100, each data sub-stream is mapped to a separate antenna 108. Such an implementation is appropriate for spatially uncorrelated radio channels. In the general case, for which a suitable BS 100 is illustrated in FIG. 2, each data sub-stream could be sent to each antenna 108 after applying a complex weight 202 (with one weight value per antenna 108 for each data sub-stream). This approach can be used to map each data sub-stream to a different antenna beam. The antenna beams may be aimed in predetermined directions, or the directions may be determined dynamically to take advantage of changing radio channel conditions. An example of a MIMO system with dynamically changing beam directions is disclosed in our co-pending unpublished United Kingdom patent application 0102316.7 (Applicant's reference PHGB010012). A special case of interest is where each data stream is mapped to a subset of the antennas (i.e. some of the weights are zero).

For simplicity, the following embodiments use the simplest case of a one-to-one mapping between data sub-streams and antennas 108, but it will be appreciated that the present invention is not limited to such a scenario.

Figure 3:
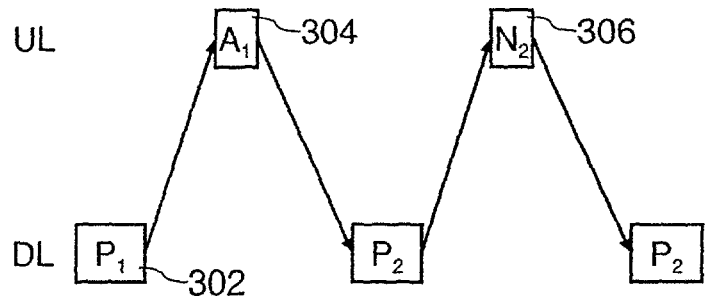
FIG. 3 is a diagram illustrating operation of a conventional ARQ scheme.

In a packet data transmission system, ARQ can be used to correct any erroneous packets. An example of an ARQ scheme operating in known manner is illustrated in FIG. 3. Data packets 302, identified as $P_n$ where n is a sequence number, are transmitted in sequence on a downlink (DL) channel from a BS 100 to a MS 110. In the illustrated scenario, the first data packet $P_1$ is received correctly by the MS 110, which transmits an acknowledgement ($A_1$) 304 on an uplink channel (UL). In response to receipt of $A_1$ by the BS 100, the next packet awaiting transmission, $P_2$, is selected and transmitted to the MS 110. However, this packet is not received correctly by the MS 110, which issues a negative acknowledgement ($N_2$) 306. In response to this, the BS 100 transmits packet $P_2$.

Other techniques may be used instead of simple retransmission of a data packet 302 in response to a negative acknowledgement 306. An example of such a technique is ARQ using incremental redundancy, where retransmissions relating to a packet are not identical to the originally-transmitted packet but include additional redundant information. Data throughput may be increased by use of other techniques, one example of which is n-channel stop-and-wait ARQ. This scheme takes advantage of the significant time gaps in the basic scheme shown in FIG. 3 to permit transmission of up to n packets before any are positively acknowledged. An advantage over conventional stop-and-wait ARQ schemes (such as that shown in FIG. 3) is that if one packet is not received correctly, further packets may continue to be sent on the other channels in parallel with retransmissions of the packet received with errors. Such a scheme may also be used when a MS 110 has data links with a plurality of BSs 100, as disclosed in our co-pending unpublished United Kingdom patent application 0104830.5 (Applicant's reference PHGB010028).

Figure 4:
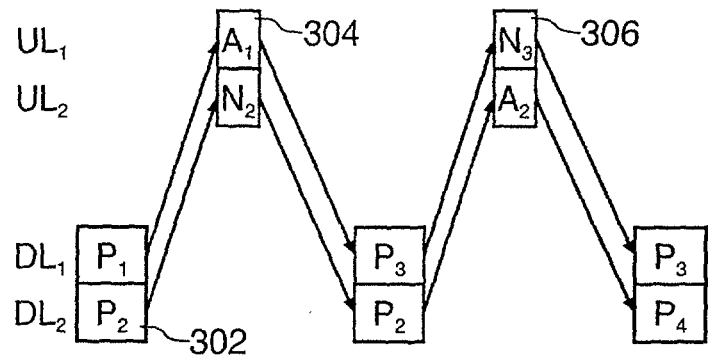
FIG. 4 is a diagram illustrating operation of a first embodiment of an ARQ scheme in accordance with the present invention.

A simple embodiment of a MIMO packet data transmission scheme operating in accordance with the present invention is shown in FIG. 4. In this embodiment each data sub-stream is allocated a separate ARQ channel, and the BS 100 and MS 110 each have two antennas 108, 118. In the example shown, the BS 100 transmits two packets 302, $P_1$ and $P_2$, as part of respective downlink data sub-streams $DL_1$ and $DL_2$ transmitted from respective antennas 108. The packets 302 are transmitted substantially simultaneously. This can be done in a CDMA (Code Division Multiple Access) system using the same channelisation and scrambling codes.

The MS 110 only receives packet $P_1$ correctly, and hence transmits an acknowledgement ($A_1$) 304 and a negative acknowledgement ($N_2$) 306 as part of respective uplink data sub-streams $UL_1$ and $UL_2$ transmitted from respective antennas 118. The positive and negative acknowledgements $A_1$ and $N_2$ are transmitted substantially simultaneously using the same channelisation and scrambling codes. In response, the BS 100 transmits the next packet $P_3$ via sub-stream $DL_1$ and re-transmits packet $P_2$ via sub-stream $DL_2$. This time the MS 110 only receives packet $P_2$ correctly, and therefore issues negative and positive acknowledgements, $N_3$ and $A_2$, via respective uplink sub-streams $UL_1$ and $UL_2$. As a result the BS 100 re-transmits packet $P_3$ via sub-stream $DL_1$ and transmits the next packet $P_4$ via sub-stream $DL_2$.

In the general case, almost any mechanism could be used for transmission of the acknowledgements 304, 306, including time multiplexing on a single channel, or simultaneous transmission via different channels. The uplink transmission method and radio channel may also be different from that used on the downlink. The most important requirement is that an acknowledgement is received by the BS 100 in time for it to determine whether to send a re-transmission or a new packet 302.

The BS 100 and/or MS 110 may make use of packets 302 received incorrectly to identify bad radio channels (i.e. bad antennas 108 or bad antenna beams), to enable performance to be optimised by avoiding such antennas or beams.

Figure 5:
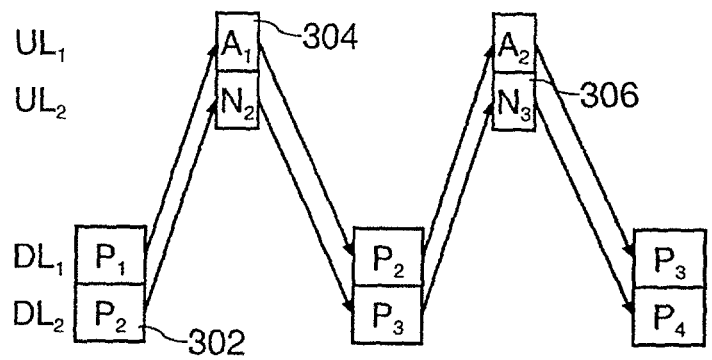
FIG. 5 is a diagram illustrating operation of a second embodiment of an ARQ scheme in accordance with the present invention.

A variation on this embodiment is shown in FIG. 5, in which retransmission of a packet 302 which was not received correctly by the MS 110 takes place via a different sub-stream. This avoids the case that one packet is delayed substantially when interference prevents successful reception of any packets 302 via a particular sub-stream. In the example illustrated, the same packets 302 are transmitted but the sub-streams used for transmission of packet $P_3$ and re-transmission of packet $P_2$ are reversed compared to FIG. 4.

Since the radio link quality might be different for each sub-stream, data for respective sub-streams could be derived from different data sources with different quality requirements. The level of FEC applied to each sub-stream could optionally be varied depending on the quality of the radio link, as disclosed in our co-pending unpublished International patent application PCT/EP01/13690 (Applicant's reference PHGB 000168). Further, different choices of Modulation and Coding Scheme (MCS) could be made for different sub-streams, and the sub-streams could be transmitted at different power levels in response to different channel conditions.

In a further variation on the above embodiments, separate closed loop power control may be applied to the transmissions from each antenna 108 (e.g. using dedicated channels). Such a scheme could help with selection of an optimum antenna 108, as well as selection of a suitable MCS, as disclosed in our co-pending unpublished International patent application PCT/IB01/02555 (Applicant's reference PHGB010022).

Figure 6:
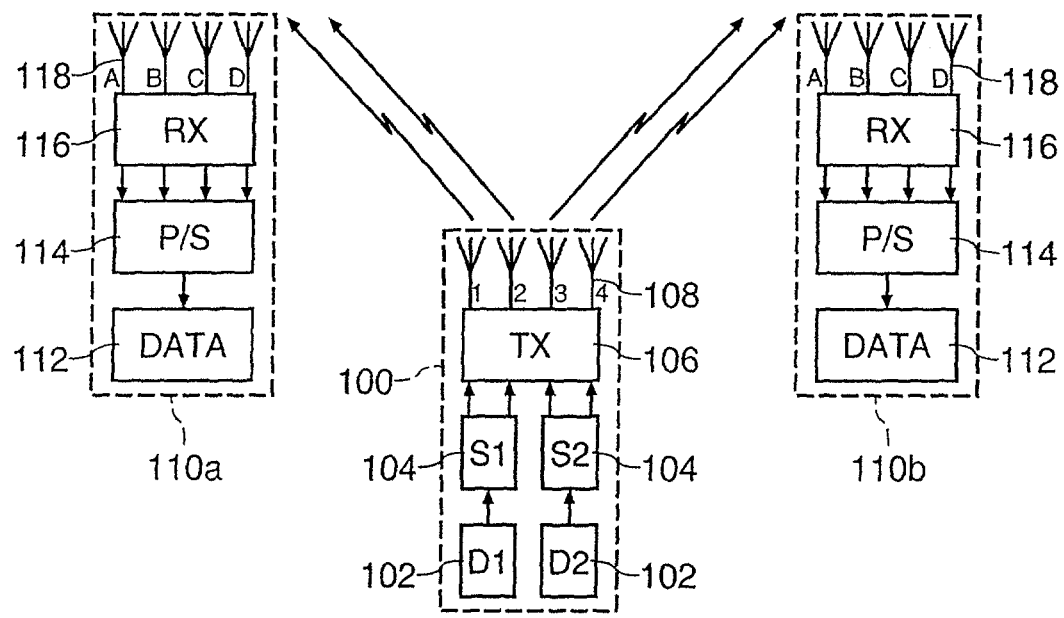
FIG. 6 is a block schematic diagram of an embodiment of a MIMO radio system in which different sub-streams are directed at different terminals.

In another embodiment of the present invention, illustrated in FIG. 6, different sub-streams may be routed to different terminals 110*a*, 110*b*. In the example illustrated, a BS 100 comprises two data sources 102 (D1 and D2), each intended for a different MS 110. Data from data source D1, intended for a first MS 110*a*, is divided into two sub-streams by a serial to parallel converter 104 (S1) and provided to a transmitter (TX) 106. These two data sub-streams are transmitted via antennas 108 labelled 1 and 2. Similarly, data from data source D2, intended for a second MS 110*b*, is divided into two sub-streams by a serial to parallel converter 104 (S2) and provided to the transmitter 106. These two data sub-streams are transmitted via antennas 108 labelled 3 and 4. It should be noted that this scheme does not require that antenna beams are directed towards the respective MSs 110*a*, 110*b*, although this may be implemented.

Using MIMO, in a scenario such as that shown in FIG. 1 or 6, each MS 110 receiving any data with a given channelisation code must, in general, have sufficient antennas 118 or other means to separate each of the different data sub-streams, perhaps discarding any unwanted ones. In known MIMO systems this requires at least M antennas, where M is the number of independent data sub-streams being transmitted with that channelisation code.

In order to obtain good performance in scheduling the use of downlink resources (channelisation codes and power) it is desirable that the downlink channel quality is known at the BS 100 for each possible radio link. This could be signalled directly for each sub-stream or determined in some other way (for example by the use of closed loop power control or feedback signals for antenna diversity). It is also important that the number of antennas, or ability to process multiple data streams, at each MS 110 is known to the BS 100. This could be signalled as a part of a registration process, in which the MS 110 informs the BS 100 of its capabilities.

Figure 7:
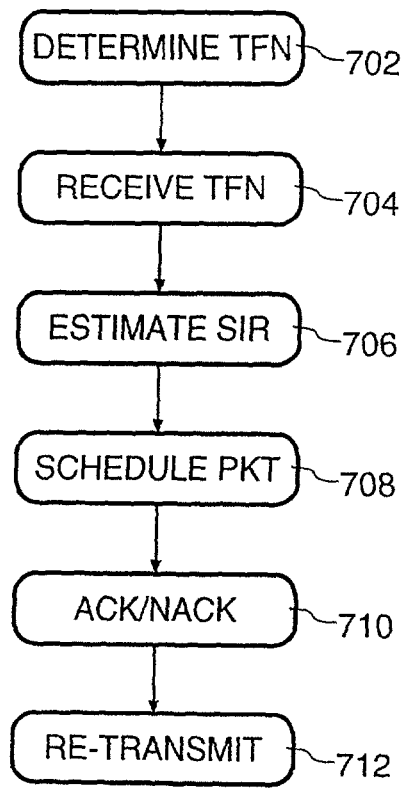
FIG. 7 is a flow chart illustrating operation of a MIMO radio system made in accordance with the present invention.

FIG. 7 is a flow chart illustrating one possible application of a method in accordance with the present invention to HSDPA. The method comprises the following steps:

702. A MS 110 uses pilot signals from each antenna 108 at the BS 100 to determine transfer function for each antenna pair.
704. The BS 100 receives information from each MS 110 on the channel transfer function between each pair of antennas 108, 118 at the BS 100 and MS 110.
706. The BS 100 estimates achievable SIRs for each antenna pair (optionally using other information, such as from closed loop power control).
708. Based on the SIR information the BS 100 schedules transmissions of data packets to mobiles 110, selecting: modulation, coding scheme, channnelisation code(s) and antenna 108 for each packet 302. Typically, there would be constraints imposed by number of available channelisation codes, and maximum output power per antenna 108.
710. Each MS 110 sends an ACKnowledgement (ACK) 304 for packets 302 received correctly and a Negative ACKnowledgement (NACK) 306 for packets 302 received incorrectly.

712. Erroneous packets 302 are scheduled for re-transmission by the BS 100 (with the exact contents of the re-transmission being determined according to the ARQ scheme being used).

There are a range of possible alternatives for the scheduling at step 708, for example, packets could be sent by the BS 100 in the order received, or preference could be given to sending data over radio links with high SIR. In an embodiment employing beamforming, to direct antenna beams in particular directions, more detailed information on the channel is needed at the BS 100 (to allow the correct antenna weights 202 to be used). This information may need to be signalled from the MS 110. Signalling to a MS 110 may also be needed to indicate which antenna transmissions (or beams) contain data for it, and which should be rejected as unwanted interference.

The present invention can be applied to mobile radio (e.g. UMTS), cordless and WLAN systems. It is particularly suited to the HSDPA concept, but not limited to it. The description above relates to a UMTS Frequency Division Duplex (FDD) mode. The invention could also be applied to a Time Division Duplex (TDD) system. In this case the fact that the uplink and downlink channel use different time slots at the same frequency (i.e. reciprocal channel) could reduce the need for signalling of channel information.

The present invention is also particularly applicable to CDMA systems in which the BS 100 typically provides pilot information to facilitate channel estimation. In the case of CDMA the possibility is already known of sending multiple data streams with different spreading codes or the same spreading code offset in time. These techniques can be used in conjunction with the present invention, in which more than one data stream has the same spreading code.

In the above description, the term 'Base Station' or 'Primary Station' relates to an entity which may in practice be distributed between a variety of parts of the fixed infrastructure. In a UMTS system, for example the functions of a BS 100 are carried out in a "Node B", which is the part of the fixed infrastructure directly interfacing with a MS 110, and at a higher level in the Radio Network Controller (RNC). As well as their use in transmission of data packets from a BS 100 to a MS 110, the techniques described may also be used for packet transmission in the reverse direction. In this case, the roles of the BS 100 and MS 110 would be reversed in the description above, with the BS 100 adopting the role of a secondary station and the MS 110 the role of a primary station.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system having a communication channel comprising:
   a primary station having a plurality of antennas;
   a secondary station having at least one antenna; and
   a plurality of paths between the primary station and the secondary station,
   the primary station further comprising:
      means for transmitting, substantially simultaneously, a plurality of data packets to the secondary station, the packets being transmitted via different subsets of the plurality of paths, and
   the secondary station further comprising:
      means for:
         receiving the plurality of data packets,
         determining whether the data packets were received correctly,
         signaling said determination to the primary station for the plurality of packets,
         signaling to the primary station a number of simultaneous data streams that the secondary station is capable of receiving or processing, and
         receiving a re-transmission of incorrectly received data packets via selected ones of the subsets of the plurality of paths, said selected ones of the subsets of the plurality of paths corresponding to the subsets of the plurality of paths utilized for an initial transmission of the incorrectly received data packets, and
   wherein at least one of a modulation scheme and a coding scheme for re-transmission of said data packets on said selected ones of the subsets of the plurality of paths is different from the modulation and coding scheme utilized for said selected ones of the subsets of the plurality of paths during said initial transmission of said data packets.

2. A primary station comprising:
   a plurality of antennas for use in a radio communication system having a communication channel comprising a plurality of paths between the primary station and a secondary station having at least one antenna: and
   means for:
      transmitting substantially simultaneously a plurality of data packets to the secondary station, the data packets being transmitted via different subsets of the plurality of paths,
      receiving from the secondary station a determination of whether the data packets were received incorrectly, said determination including capacity information indicating a number of simultaneous data streams that the secondary station is capable of receiving or processing; and
      re-transmitting said data packets determined to be received incorrectly via selected ones of the subsets of the plurality of paths, said selected ones of the subsets of the plurality of paths being selected based at least on a quality of conditions of said subsets of the plurality of paths, and wherein at least one of a modulation scheme and a coding scheme for re-transmission of said data packets on said selected ones of the subsets of the plurality of paths is different from the modulation and coding scheme utilized for said selected ones of the subsets of the plurality of paths during an initial transmission of said data packets.

3. The primary station as claimed in claim 2, further comprising:
   means for mapping each data packet to one of the plurality of antennas.

4. The primary station as claimed in claim 2, further comprising:
   means for mapping each data packet to a respective antenna beam.

5. The primary station as claimed in claim 2, further comprising:
means for varying transmission parameters relating to a data packet depending on the subset of the plurality of paths over which the packet is transmitted.

6. The primary station as claimed in claim 5, wherein the varied transmission parameters are selected from modulation scheme, coding scheme and transmit power level.

7. The primary station as claimed in claim 5, further comprising:
closed loop power control means for adjusting independently a transmit power of each subset of paths.

8. A secondary station comprising:
at least one antenna for use in a radio communication system having a communication channel comprising a plurality of paths between a primary station having a plurality of antennas and the secondary station; and
means for:
receiving a plurality of data packets transmitted substantially simultaneously by the primary station, the packets being transmitted via different subsets of the plurality of paths,
determining whether each data packet is received correctly,
signaling said determination to the primary station for the plurality of data packets,
signaling to the primary station a number of simultaneous data streams that the secondary station is capable of receiving or processing; and
receiving a re-transmission of incorrectly received data packets via selected ones of the subsets of the plurality of paths, said selected ones of the subsets of the plurality of paths corresponding to the subsets of the plurality of paths utilized for an initial transmission of the incorrectly received data packets, and
wherein at least one of a modulation scheme and a coding scheme for re-transmission of said data packets on said selected ones of the subsets of the plurality of paths is different from the modulation and coding scheme utilized for said selected ones of the subsets of the plurality of paths during said initial transmission of said data packets.

9. The secondary station as claimed in claim 8, wherein a communication channel between the secondary station and the primary station comprises a subset of the plurality of paths, and said means further comprises:
means for transmitting substantially simultaneously acknowledgements corresponding to each of the simultaneously transmitted data packets, each acknowledgement being transmitted via a different subset of the plurality of paths.

10. The secondary station as claimed in claim 8, further comprising:
means for signaling channel quality feedback information to the primary station, the information relating to each of the subsets of paths used to transmit data packets.

11. The secondary station as claimed in claim 8, wherein the number of simultaneous data streams are transmitted via subsets of the plurality of paths using same air interface resources.

12. The secondary station as claimed in claim 11, wherein the system operates according to a code division multiple access protocol and wherein air interface resources comprise channelization and spreading codes.

13. A method of operating a radio communication system having a communication channel comprising a plurality of paths between a primary station having a plurality of antennas and a secondary station having at least one antenna, the method comprising:
transmitting, by the primary station, substantially simultaneously, a plurality of data packets to the secondary station, the data packets being transmitted via different subsets of the plurality of paths;
receiving, by the secondary station, the plurality of data packets;
determining, by the secondary station, whether the plurality of data packets were received correctly;
signaling said determination to the primary station;
signaling to the primary station a number of simultaneous data streams that the secondary station is capable of receiving or processing; and
receiving a re-transmission of incorrectly received data packets via selected ones of the subsets of the plurality of paths, said selected ones of the subsets of the plurality of paths corresponding to the subsets of the plurality of paths utilized for an initial transmission of the incorrectly received data packets, and
wherein at least one of a modulation scheme and a coding scheme for re-transmission of said data packets on said selected ones of the subsets of the plurality of paths is different from the modulation and coding scheme utilized for said selected ones of the subsets of the plurality of paths during said initial transmission of said data packets.

14. A primary station comprising:
a plurality of antennas for use in a radio communication system having a communication channel comprising a plurality of paths between the primary station and a secondary station having at least one antenna: and
a transceiver configured to:
transmit, substantially simultaneously, a plurality of data packets to the secondary station, the data packets being transmitted via different subsets of the plurality of paths,
receive from the secondary station an indication of said data packets received incorrectly, said indication including capacity information indicating a number of simultaneous data streams that the secondary station is capable of receiving; and
re-transmit incorrectly received data packets via selected ones of the subsets of the plurality of paths, said selected ones of the subsets of the plurality of paths corresponding to the subsets of the plurality of paths utilized for an initial transmission of the incorrectly received data packets, and
wherein at least one of a modulation scheme and a coding scheme for re-transmission of said data packets on said selected ones of the subsets of the plurality of paths is different from the modulation and coding scheme utilized for said selected ones of the subsets of the plurality of paths during said initial transmission of said data packets.

15. The primary station as claimed in claim 14, further comprising:
a processor configured to:
map each data packet to one of the plurality of antennas;
apply weights for mapping each data packet to a respective antenna beam; and
vary one of the modulation scheme, the coding scheme and a transmit power level used for transmitting the data packet, said one of said modulation scheme, said coding scheme, and said transmit power level selected based on the subset of the plurality of paths over which the data packet is transmitted.

16. The primary station as claimed in claim 14, further comprising:
a closed loop power controller, said close loop power controller adjusting, independently, a transmit power of each subset of the plurality of paths.

17. A secondary station comprising:
at least one antenna for use in a radio communication system having a communication channel comprising a plurality of paths between a primary station having a plurality of antennas and the secondary station; and
a transceiver configured to:
receive a plurality of data packets transmitted substantially simultaneously by the primary station, the packets being transmitted via different subsets of the plurality of paths,
signal a determination of which data packets are received correctly to the primary station,
signal to the primary a number of simultaneous data streams that the secondary station is capable of receiving; and
receive a re-transmission of incorrectly received data packets via selected ones of the subsets of the plurality of paths, said selected ones of the subsets of the plurality of paths corresponding to the subsets of the plurality of paths utilized for an initial transmission of the incorrectly received data packets, and
wherein at least one of a modulation scheme and a coding scheme for re-transmission of said data packets on said selected ones of the subsets of the plurality of paths is different from the modulation and coding scheme utilized for said selected ones of the subsets of the plurality of paths during said initial transmission of said data packets.

18. The secondary station as claimed in claim 17, wherein said transceiver is configured to:
transmit, substantially simultaneously, acknowledgements corresponding to each of the simultaneously received data packets, each acknowledgement being transmitted via a different subset of the plurality of paths.

19. The secondary station as claimed in claim 17, wherein said transceiver is configured to:
signal channel quality feedback information to the primary station, the information relating to each of the subsets of paths used to transmit data packets.

20. The secondary station as claimed in claim 17, wherein the simultaneous data streams are transmitted via subsets of the plurality of paths using the same air interface resources.

* * * * *